United States Patent [19]

Baldwin

[11] 3,821,356

[45] June 28, 1974

[54] PRODUCTION OF HIGH PURITY HALIDES
[75] Inventor: Willis H. Baldwin, Erie, Tenn.
[73] Assignee: The United States of America as represented by the United States Atomic Energy Commission, Washington, D.C.
[22] Filed: Mar. 8, 1973
[21] Appl. No.: 339,488

[52] U.S. Cl............. 423/250, 423/251, 423/252, 423/253, 423/254, 423/257, 423/258, 423/259, 423/263, 423/491
[51] Int. Cl. ... C01q 56/00, C01g 43/00, C01b 9/00
[58] Field of Search .......... 423/250, 251, 252, 253, 423/254, 257, 258, 259, 263, 491

[56] References Cited
UNITED STATES PATENTS
2,578,416  12/1951  Fried et al. ................... 423/250
2,756,124  7/1956   Patterson et al. .............. 423/257
2,932,553  4/1960   Didtschenko .................. 423/252
2,992,066  7/1961   Burger et al. ................. 423/251
3,123,436  3/1964   Benz ........................... 423/251
3,646,080  2/1972   Pobiner ....................... 423/263 X Primary Examiner—Benjamin R. Padgett
Assistant Examiner—R. L. Tate
Attorney, Agent, or Firm—John A. Horan; David S. Zachry; Irving Barrack

[57] ABSTRACT

A single-step process for the conversion of lanthanide or actinide oxides by taking advantage of the halogenating and solvent capacity of selected amine hydrohalides is described. The process can be conducted in a single reaction vessel with a minimum of manipulations.

4 Claims, No Drawings

PRODUCTION OF HIGH PURITY HALIDES

BACKGROUND OF THE INVENTION

The invention described herein was made in the course of, or under, a contract with the U.S. Atomic Energy Commission.

The present invention relates to a method for the preparation of anhydrous lanthanide, actinide, and other metal halides. Anhydrous lanthanide and actinide halides are widely used as the starting material for the production of their respective metals by electrolytic or metallothermic methods. They are also useful as starting materials from which other anhydrous compounds can be prepared.

Although several methods for preparing anhydrous lanthanide compounds are available, they each present problems. Thus in one well-known preparatory method lanthanide oxide is reacted with an aqueous solution of a hydrohalide acid such as HCl, HBr, or HI to produce the hydrated halide. Attempts to dehydrate the hydrated halide lead to hydrolysis to form the oxychloride or to decomposition. Complete freedom from moisture is extremely difficult when the preparative scheme employs an aqueous system. Another common preparatory method involves the reaction of a rare earth oxide with a stoichiometric excess of ammonium halide, generally the chloride. The reaction mixture is heated to a temperature in the range 300° to 600° C. to drive off excess $NH_4Cl$ and reaction product water which evolves as steam. This method also has problems. It is an essentially solid-solid reaction requiring both solids to be finely divided to get a smooth, even reaction. In addition, the high reaction temperature needed to effect conversion to the halide is accompanied by reaction of the halide with the steam reaction product causing an oxide coating to form on the halide. This in turn causes incomplete reaction and, of course, results in an oxide contaminated product.

A process for producing a fairly pure grade of lanthanide halide is described in U.S. Pat. No. 2,932,553. In that process a hydrated halide is reacted with an organic amine halide dissolved in an organic solvent such as ethyl alcohol to produce a solvent-insoluble precipitate consisting of a double salt of the lanthanide halide and the organic amine halide. In the case where the lanthanide is cerium chloride and the organic hydrohalide is pyridine hydrochloride, the precipitated double salt is cerium trichloride — pyridine hydrochloride. This precipitate is separated by filtration and ultimately converted to the desired anhydrous trichloride by dehydration and decomposition of the separated salt.

SUMMARY OF THE INVENTION

The present invention represents a simplified method of obtaining purified anhydrous lanthanide halides from their respective oxides and is based on the discovery that a lanthanide oxide can be converted to a desired anhydrous halide in a single reaction vessel. My invention is based on the discovery that selected amine hydrohalides can serve simultaneously as the solvent and as halogenating agent for rare earth oxides or metal to react the oxide with part of the hydrohalide solvent to produce a double salt. By heating the reaction mixture to volatilize the solvent and thereafter decomposing the double salt of the metal halide with the selected hydrohalide, a solid residue results which consists of the desired pure form of a desired anhydrous rare earth halide.

Highly purified rare earth oxides commonly produced from ion exchange separation technology are excellent starting materials for this process. Selected hydrohalides can also be prepared in pure form so that the possibility for impurity contamination is reduced to a minimum. Selected amine hydrohalides which have a melting point below about 200° C. are eminently suitable as the solvent-halogenating reactant. Reactants which melt above 200° C. have a higher tendency to decompose and create charring. Among the useful hydrochlorides which may serve a dual solvent-halogenating function are the hydrochlorides, fluorides, bromides, or iodides of aniline, N-methyl aniline, N,N-dimethyl aniline, methylamine, dimethylamine, ethylamine, diethylamine, methylethylamine, monoisobutylamine, cyclohexylamine, hydroxylamine, hydrazine, quinoline, and pyridine.

To practice this invention a reaction flask or container attached to a suitable distillation column is all the basic apparatus required. A selected oxide and hydrohalide are added to the flask such that there is at least three times as much hydrohalide as oxide. The reaction mixture is heated to above the melting point of the hydrohalide while passing an inert sweep gas over the mixture to remove moisture. The oxide dissolves in the molten hydrohalide and heating is continued until a clear solution is obtained indicating completion of the reaction. For example, with a mixture of pyridine, HCl, and $Ho_2O_3$, the initial molten mixture appears translucent with a yellow hue, while the completion of the reaction is signified by a clear solution of the hydrohalide containing the dissolved double salt with the color that is typical of the cation. For example, holmium is water-white to light yellow, neodymium solutions have a purple shade, uranyl solutions are distinctly yellow, and lanthanum solutions are water-white.

The pyridine hydrochloride solution containing the dissolved double salt of holmium, the chloride, and pyridine hydrogen chloride was then evacuated to a pressure of 0.05 to 1.00 mm Hg and the temperature slowly increased to about 300° C. for a period of time sufficient to remove excess pyridine, pyridine hydrochloride, and any water vapor. The remaining solid residue consisted of substantially pure holmium trichloride.

The overall reaction occurring with a rare earth oxide is represented by the formula $$M_2O_3 + AmHX \xrightarrow{\Delta} MX_3 + Am + H_2O,$$ where $M =$ a metal having an atomic number of 39 and from 57 to 71;

$X = F, Cl, Br, I$; and $Am =$ an organic amine reagent-halogenating hydrohalide of the class previously described.

The general procedure described above has been used to produce a number of high purity halides as shown in the table below.

TABLE

| Oxide | Product | Purity,* % |
|---|---|---|
| $Nd_2O_3$ | $NdCl_3$ | 99 |
| $Ho_2O_3$ | $HoCl_3$ | 98.5 |
| $UO_3$ | $UO_2Cl_2$ | 100 |
| $La_2O_3$ | $LaCl_3$ | 99 |

*As determined by elemental analysis of metal and halogen; gas chromatography was used to assay amine and water content.

Other pure halides made by the process as herein described include $YCl_3$, $LaCl_3$, $CeCl_3$, $NdBr_3$, $NdI_3$, and $ThF_4$. The nature of the product obtained with actinides depends on the valence of the starting oxide and the stability of the oxidation state of the actinide. Thus $UO_3$ and $U_3O_8$ yield $UO_2Cl_2$ whereas $UO_2$ and $AmO_2$ yield $UCl_4$ and $AmCl_3$, respectively, by reaction with pyridine hydrochloride.

It will be seen that a simple, direct method of preparing lanthanide and actinide anhydrous halide is provided. The entire preparatory method may be conducted in a single reaction chamber, involving a minimum of manipulations such as forming a precipitate and then filtering the precipitate. The method minimizes compound loss which is characteristic of multi-step operations. These advantages are particularly valuable when dealing with small quantities of valuable materials such as radioactive actinides. Other anhydrous metal halides and oxyhalides may also be prepared in accordance with the general method described.

What is claimed is:

1. A method for preparing an anhydrous metal trihalide comprising reacting a metal oxide with at least a threefold excess of a liquefied hydrohalide wherein the reaction between said hydrohalide and metal oxide is represented by the following equation:

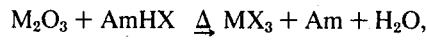
$$M_2O_3 + AmHX \xrightarrow{\Delta} MX_3 + Am + H_2O,$$

where

M = a metal having an atomic number of 39 and from 57 to 71, inclusive;

X = F, Cl, Br, I; and

Am = an amine selected from the group consisting of N,methyl aniline, N,N-dimethyl aniline, methylamine, dimethylamine, ethylamine, diethylamine, methylethylamine, monoisobutylamine, cyclohexylamine, hydroxylamine, hydrazine, quinoline, and pyridine with reacts with X to form an amine hydrohalide, decomposing the resultant double salt formed between the halide of said oxide and said amine hydrohalide, and then recovering an anhydrous metal halide of said oxide.

2. A method for preparing an anhydrous halide comprising reacting a metal oxide $ZO_2$ where Z is an actinide having an atomic number in the range 90–103 with at least a threefold excess of a liquefied amine hydrohalide derived from an amine selected from the group consisting of N-methyl aniline, N,N-dimethyl aniline, methylamine, dimethylamine, ethylamine, diethylamine, methylethylamine, monoisobutylamine, cyclohexylamine, hydroxylamine, hydrazine, quinoline, and pyridine to convert the oxide to a double salt of the halide of said oxide and said amine hydrohalide, heating the reaction mixture to decompose said double salt and volatilize the hydrohalide and recovering a solid residue comprising said anhydrous halide.

3. The method according to claim 2 wherein the metal oxide is selected from the group consisting of $UO_3$ and $U_3O_8$ and the resulting anhydrous halide is $UO_2X_2$ where X = F, Cl, Br, and I.

4. The method according to claim 3 wherein the metal oxide is an actinide oxide $ZO_2$ where Z is an actinide having an atomic number in the range 90–103 and the resulting anhydrous halide is $ZX_3$ or $ZX_4$ where X = F, Cl, Br, and I.

* * * * *